United States Patent
Takahashi

(10) Patent No.: US 10,356,284 B2
(45) Date of Patent: Jul. 16, 2019

(54) COLOR PROCESSING APPARATUS, COLOR PROCESSING METHOD, NON-TRANSITORY COMPUTER-READABLE STORAGE MEDIUM

(71) Applicant: CANON KABUSHIKI KAISHA, Tokyo (JP)

(72) Inventor: Kosei Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 15/415,616

(22) Filed: Jan. 25, 2017

(65) Prior Publication Data

US 2017/0230545 A1    Aug. 10, 2017

(30) Foreign Application Priority Data

Feb. 10, 2016 (JP) ................................ 2016-023979

(51) Int. Cl.
*H04N 1/60* (2006.01)
*H04N 1/00* (2006.01)

(52) U.S. Cl.
CPC ....... *H04N 1/6027* (2013.01); *H04N 1/00068* (2013.01); *H04N 1/60* (2013.01)

(58) Field of Classification Search
CPC ..... H04N 1/00068; H04N 1/60; H04N 1/6027
See application file for complete search history.

(56) References Cited

U.S. PATENT DOCUMENTS

| | | | |
|---|---|---|---|
| 6,987,567 B2 | 1/2006 | Takahashi et al. | 356/405 |
| 7,433,102 B2 | 10/2008 | Takahashi et al. | 358/518 |
| 7,443,536 B2 | 10/2008 | Takahashi | 358/1.9 |
| 7,616,361 B2 | 11/2009 | Takahashi | 358/520 |
| 7,667,845 B2 | 2/2010 | Takahashi et al. | 356/405 |
| 8,929,654 B2 * | 1/2015 | Gish | H04N 1/60 382/162 |
| 9,008,412 B2 | 4/2015 | Takahashi | 382/154 |
| 9,317,938 B2 | 4/2016 | Takahashi | G06T 11/001 |
| 9,407,792 B2 | 8/2016 | Takahashi | H04N 1/6011 |
| 2015/0373228 A1 * | 12/2015 | Ukishima | H04N 1/6022 358/3.24 |

FOREIGN PATENT DOCUMENTS

WO    WO 2013/101639    7/2013

* cited by examiner

*Primary Examiner* — Edward Park
(74) *Attorney, Agent, or Firm* — Venable LLP

(57) ABSTRACT

An input chromaticity data calculation unit 113 calculates input chromaticity data rg from device-dependent color data RGB. A chromaticity data transformation unit 114 transforms the input chromaticity data rg into output chromaticity data xy by referring to an LUT stored by an LUT storage unit 13. A total amount calculation unit 115 refers to the LUT of the LUT storage unit 13 to calculate a total amount $\Sigma'_{XYZ}$ of the device-independent color data XYZ from the color data RGB. An output color data calculation unit 116 uses the total amount $\Sigma'_{XYZ}$ to calculate color data XYZ from the output chromaticity data xy.

9 Claims, 7 Drawing Sheets

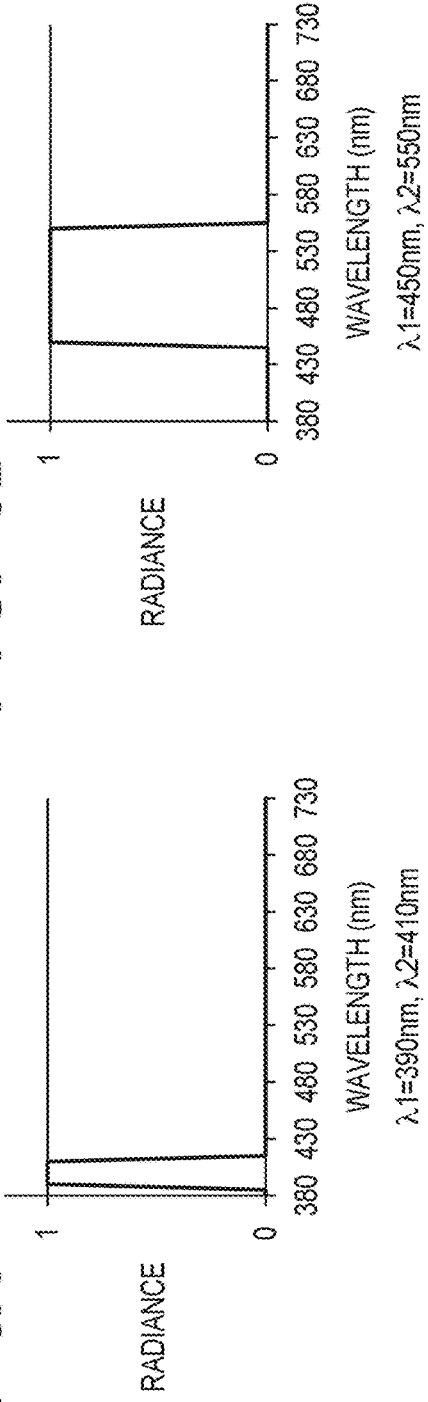
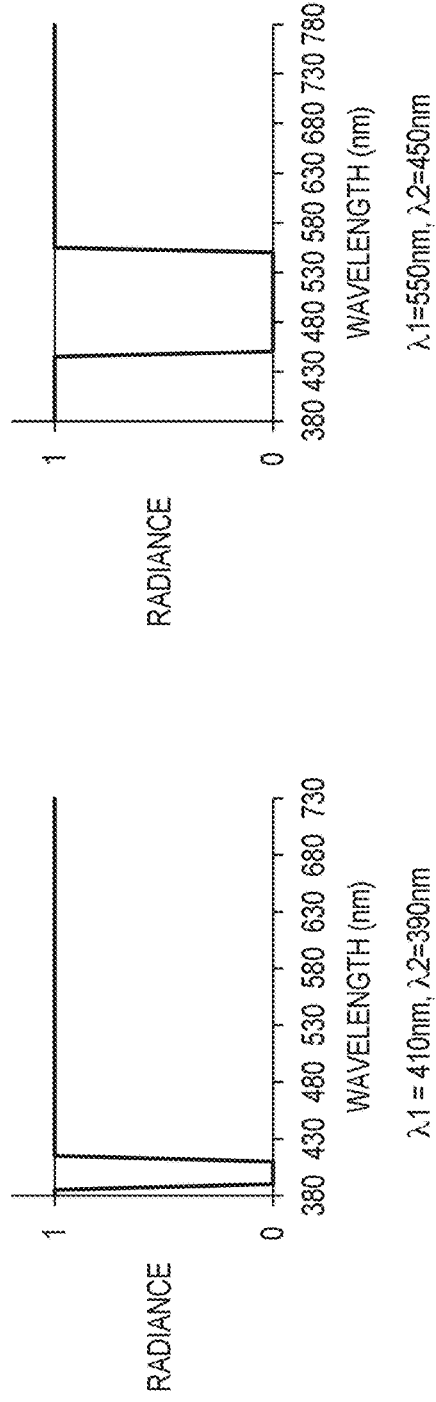

COLOR PROCESSING APPARATUS, COLOR PROCESSING METHOD, NON-TRANSITORY COMPUTER-READABLE STORAGE MEDIUM

BACKGROUND OF THE INVENTION

Field of the Invention

The present invention relates to color transformation processing of image data input from an image input device.

Description of the Related Art

Spectral sensitivity characteristics of an image input device as typified by a digital camera commonly do not match visual spectral characteristics (a color matching function) of a person. An RGB value of image data acquired by an image input device is a value that depends on characteristics of the image input device. Therefore, it is necessary to transform an RGB value that is a device-dependent color signal (hereinafter referred to as a device RGB value) into tristimulus values (XYZ values) that are device-independent color signals or a standard RGB value such as in an sRGB space or an AdobeRGB space.

A method for transforming a device RGB value into tristimulus values by a matrix operation is known, but by matrix operation processing a transformation having high precision high chroma color in particular is not achieved, and a color transformation precision decreases. Accordingly, the International Publication 2013/101639 discloses an invention that performs high precision color transformation processing in the entire region of visible light by performing a transformation from a device RGB value to an XYZ value by a lookup table (LUT) computation instead of a matrix operation.

In the invention of International Publication 2013/101639, to generate an LUT used in the color transformation, grid partitioning is performed for the entirety of a visible light range, and spectral data that corresponds to each grid point is generated. Subsequently, a device RGB value and an XYZ value corresponding to the spectral data of each grid point is calculated, and an LUT indicating a correspondence between device RGB values and XYZ values is formed. This LUT has a two-dimensional input/output format, and the invention of the International Publication 2013/101639 transforms three-dimensional color information (RGB values) into two-dimensional chromaticity information p=R/(R+G+B), q=G/(R+G+B), and inputs the chromaticity information pq into the LUT to obtain two-dimensional xy chromaticity data. The xy chromaticity data is then used to calculate tristimulus values (XYZ values).

To transform xy chromaticity data to XYZ values, conventionally there is a necessity for a value calculated by (X+Y+Z) as a transformation coefficient. Because the invention of the International Publication 2013/101639 uses a value calculated by (R+G+B) as an alternative for a transformation coefficient to calculate the XYZ values, it cannot be said that calculation precision of the XYZ values is high.

SUMMARY OF THE INVENTION

The present invention provides a technique for realizing improvement of color reproducibility precision when transforming device-dependent color data into chromaticity data, and then transforming it to device-independent color data.

According to the first aspect of the present invention, there is provided a color processing apparatus comprising: a first calculation unit configured to calculate first chromaticity data from device-dependent color data; a transformation unit configured to transform the first chromaticity data into second chromaticity data by referring to a table; a second calculation unit configured to calculate a total amount of device-independent color data from the device-dependent color data by referring to the table; and a third calculation unit configured to use the total amount to calculate the device-independent color data from the second chromaticity data.

According to the second aspect of the present invention, there is provided a color processing method, comprising: calculating first chromaticity data from device-dependent color data; transforming the first chromaticity data into second chromaticity data by referring to a table; calculating a total amount of device-independent color data from the device-dependent color data by referring to the table; and using the total amount to calculate the device-independent color data from the second chromaticity data.

According to the third aspect of the present invention, there is provided a non-transitory computer-readable storage medium storing a program for causing a computer to function as a first calculation unit configured to calculate first chromaticity data from device-dependent color data; a transformation unit configured to transform the first chromaticity data into second chromaticity data by referring to a table; a second calculation unit configured to calculate a total amount of device-independent color data from the device-dependent color data by referring to the table; and a third calculation unit configured to use the total amount to calculate the device-independent color data from the second chromaticity data.

Further features of the present invention will become apparent from the following description of exemplary embodiments (with reference to the attached drawings).

BRIEF DESCRIPTION OF THE DRAWINGS

FIGS. 3A-3D are views illustrating spectral distribution in a case when two parameters $\lambda 1$ and $\lambda 2$ are caused to change.

DESCRIPTION OF THE EMBODIMENTS

Below, explanation is given in detail with reference to the figures of an image processing apparatus (a color processing apparatus) and an image processing method (a color processing method) of embodiments according to the present invention. Note that these embodiments do not limit the present invention according to the scope of the claims, and not all of the combinations of configurations described in the embodiments are necessarily required with respect to the means to solve the problems according to the present invention.

[First Embodiment]

[Device Configuration]

Figure 1:
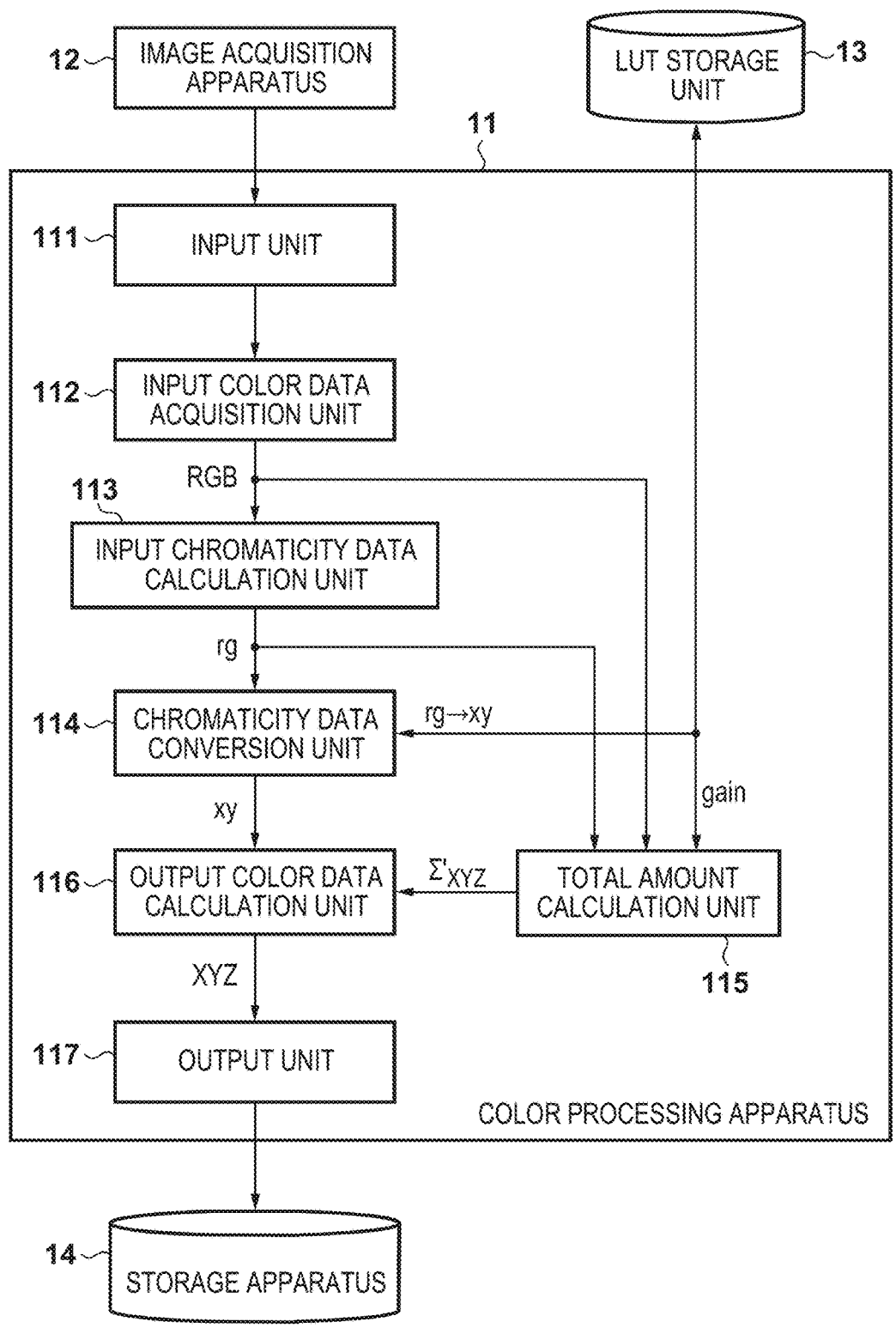
FIG. 1 is a block diagram illustrating a processing configuration example of a color processing apparatus of a first embodiment.

The block diagram of FIG. 1 illustrates an example of a processing configuration of a color processing apparatus 11 of the first embodiment. The color processing apparatus 11 performs color transformation processing of image data input from an image acquisition apparatus 12 based on a lookup table (LUT) stored by an LUT storage unit 13, and stores image data obtained by the color transformation processing in a storage device 14, for example.

In the color processing apparatus 11, an input unit 111 is input with image data (RGB data) from the image acquisition apparatus 12, which is an image input device such as a digital camera or a scanner. An input color data acquisition unit 112 acquires device-dependent three-dimensional color data (hereinafter referred to as the input color data) for each pixel of the input image data. An input chromaticity data calculation unit 113 calculates two-dimensional chromaticity data (hereinafter referred to as the input chromaticity data) from the input color data. A chromaticity data transformation unit 114 transforms the input chromaticity data into output chromaticity data based on an LUT stored by the LUT storage unit 13.

A total amount calculation unit 115 calculates, based on the input color data, a total amount of output data (hereinafter referred to as an output total amount) that is described later. An output color data calculation unit 116 uses the output chromaticity data and the output total amount to calculate device-independent output color data. An output unit 117 stores image data based on the output color data (hereinafter referred to as output image data) in the storage device 14, for example.

Figure 7:
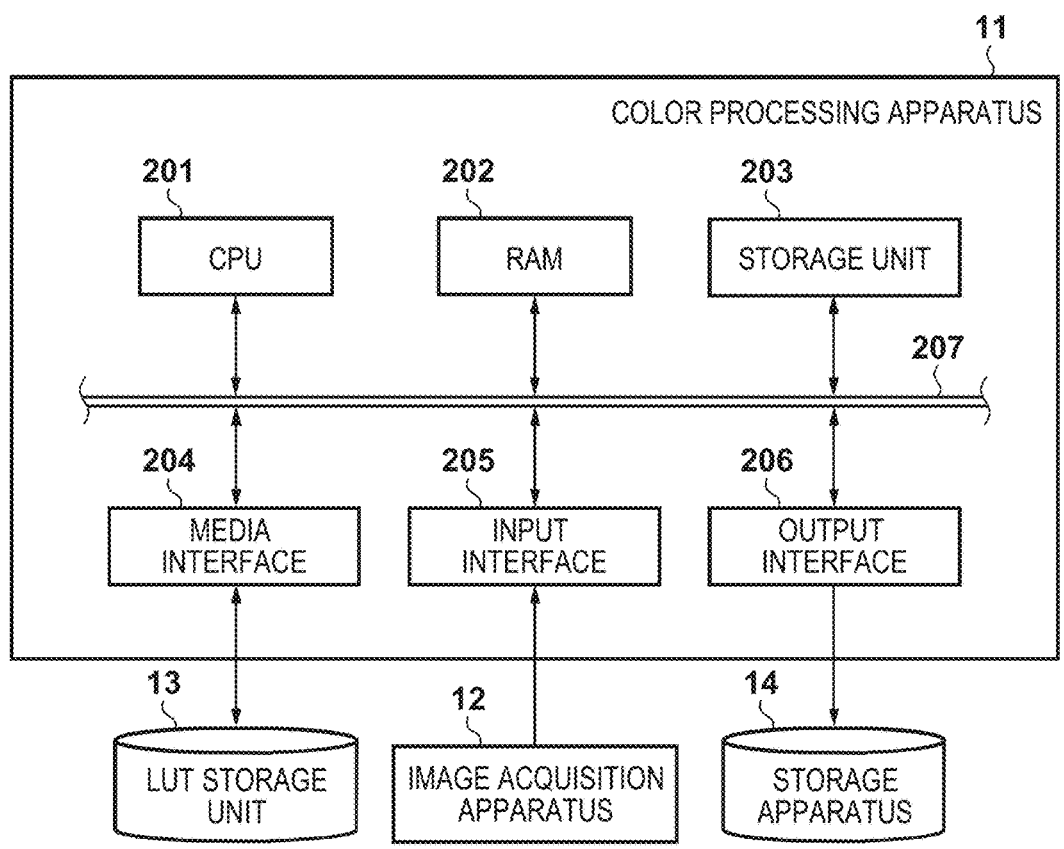
FIG. 7 is a block diagram illustrating an example of a hardware configuration of the color processing apparatus.

The block diagram of FIG. 7 illustrates an example of a hardware configuration of the color processing apparatus 11. A microprocessor (CPU) 201 realizes the processing configuration illustrated in FIG. 1 by executing a program stored in the storage unit 203 with a random access memory (RAM) 202 as a work memory. The storage unit 203 is configured by a read only memory (ROM), a flash memory, or the like, and stores an operating system (OS), a program for realizing the processing configuration, or the like.

A media interface 204 is, for example, a serial bus interface for USB or the like, a memory card host controller, or the like, and is used to connect to the LUT storage unit 13 which is provided as a USB memory or a memory card. An input interface 205 is an interface such as for, for example, USB, SATA, PCIe, SDI, MIPI (registered trademark) or the like, and is used for input of image data from the image acquisition apparatus 12 which is a digital camera, a scanner, or the like.

An output interface 206 is an interface for USB, SATA, a memory card host controller, or the like. The output interface 206 is used for output of image data to the storage device 14 which is a storage medium such as a hard disk drive (HDD), a solid state drive (SSD), USB memory, or a memory card. A CPU 201 controls each interface via a system bus 207, and performs input and output of image data and referencing of the LUT.

Note that the LUT storage unit 13 and the storage device 14 may be provided together. In addition, it is possible to use a wired or wireless network for connections between the color processing apparatus 11, the image acquisition apparatus 12, the LUT storage unit 13, and the storage device 14. In a case of using a network, the LUT storage unit 13 and the storage device 14 may be provided as server apparatuses on the network. In addition, in a case of using a monitor in place of the storage device 14 as an output destination of the output unit 117, it is possible to use SDI, HDMI (registered trademark), DisplayPort or the like as the output interface 206.

[Color Transformation Processing]

Figure 2:
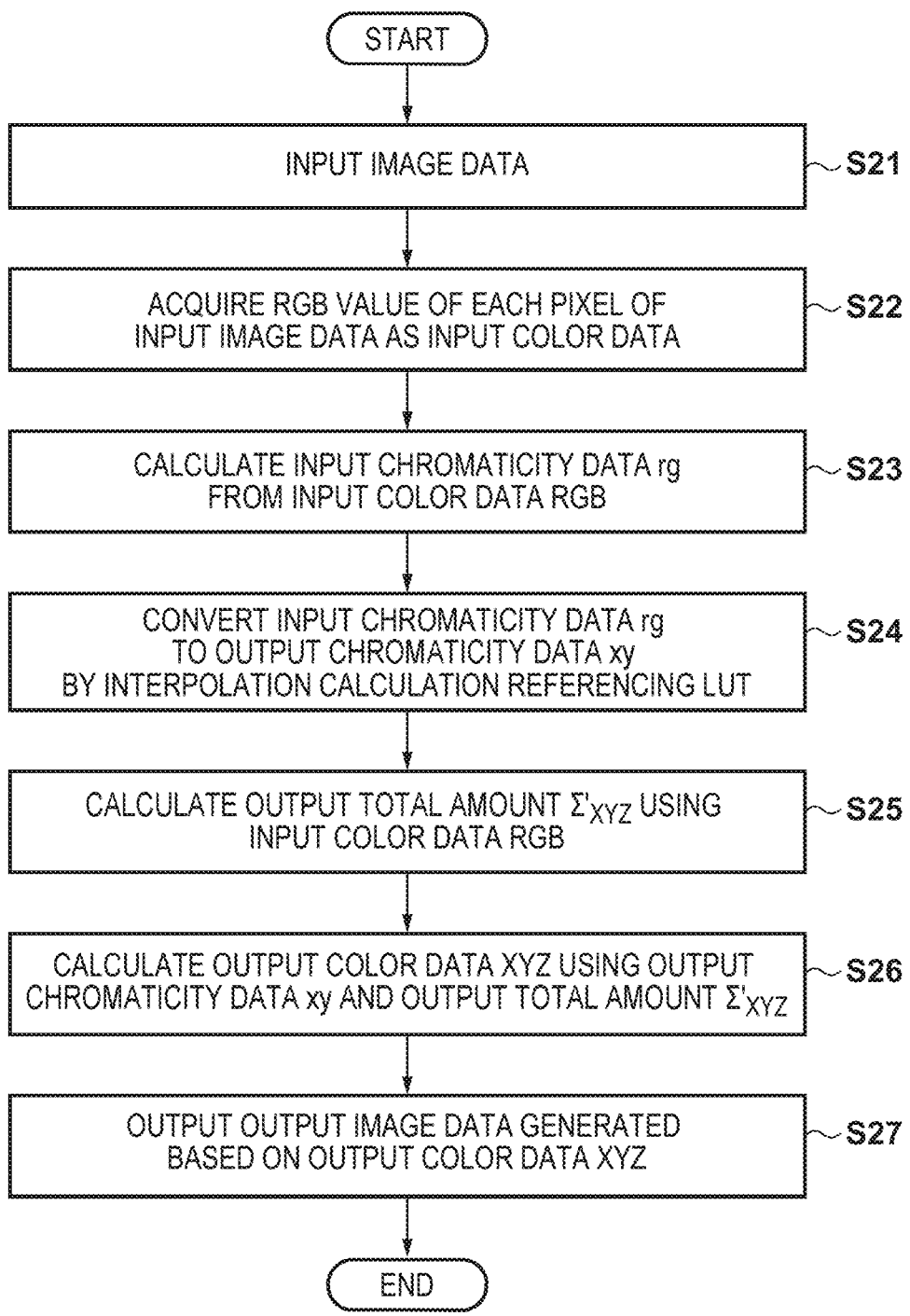
FIG. 2 is a flowchart for describing color transformation processing in the color processing apparatus.

By the flowchart of FIG. 2, description is given of color transformation processing in the color processing apparatus 11. The input unit 111 is input with image data from the image acquisition apparatus 12 (step S21). The input color data acquisition unit 112 acquires three-dimensional color data RGB for each pixel of the input image data as the input color data (step S22).

Next, the input chromaticity data calculation unit 113 calculates input chromaticity data rg from the input color data by the following equations, as input chromaticity data (step S23).

$$r = R/(R+G+B);$$

$$g = G/(R+G+B); \quad (1)$$

Next, the chromaticity data transformation unit 114 transforms the input chromaticity data rg to output chromaticity data xy by a calculation of the output chromaticity data xy from the input chromaticity data rg that uses an interpolation calculation that refers to the LUT stored in the LUT storage unit 13 (step S24). In other words, the output chromaticity data xy that corresponds to the input chromaticity data rg is stored in the LUT. Although detail is described later, the total amount calculation unit 115 calculates an output total amount $\Sigma'_{XYZ}$ from the input color data RGB, based on the input chromaticity data rg (step S25).

Next, the output color data calculation unit 116 uses the output chromaticity data xy and the output total amount $\Sigma'_{XYZ}$ to calculate output color data XYZ by the following equations (step S26).

$$X = x\Sigma'_{XYZ};$$

$$Y = y\Sigma'_{XYZ};$$

$$Z = (1-x-y)\Sigma'_{XYZ}; \quad (2)$$

Next, the output unit 117 stores output image data (the XYZ data) generated based on the output color data XYZ in the storage device 14 for example (step S27).

[LUT Generation]

Expressing a rectangular shape that indicates spectral distribution by two parameters is considered. Assuming that spectral radiance changes from 0 to 1 in a wavelength λ1 and spectral radiance changes from 1 to 0 in a wavelength λ2, it is possible to express any spectral distribution by two parameters (the wavelengths λ1 and λ2).

FIGS. 3A-3D are views illustrating spectral distribution in a case when two parameters λ1 and λ2 are caused to change. If λ1<λ2, spectral distribution of a bandpass shape as illustrated in FIGS. 3A and 3B is achieved, and if λ1>λ2, spectral distribution of a band elimination shape as illustrated in FIGS. 3C and 3D is achieved. Spectral data having the shapes illustrated in FIGS. 3A-3D is hereinafter referred to as "rectangular spectral data". It is possible to express rectangular spectral data $I_{\lambda_1\lambda_2}(\lambda)$ by the following formula.

if (λ1<λ2){ if (λ1≤λ≤λ2)

$I_{\lambda_1\lambda_2}(\lambda) = 1;$ else $I_{\lambda1\lambda2}(\lambda)=0;$

} if ($\lambda1 \geq \lambda2$){ if ($\lambda2 < \lambda < \lambda1$)

$I_{\lambda1\lambda2}(\lambda)=0;$ else $I_{\lambda1\lambda2}(\lambda)=1;$

}  (3)

Tristimulus values $X_{\lambda1\lambda2}, Y_{\lambda1\lambda2}, Z_{\lambda1\lambda2}$ of the rectangular spectral data $I_{\lambda1\lambda2}(\lambda)$ are calculated by the following equations.

$$X_{\lambda1\lambda2}=k\int_{vis}I_{\lambda1\lambda2}(\lambda)x(\lambda)d\lambda;$$

$$Y_{\lambda1\lambda2}=k\int_{vis}I_{\lambda1\lambda2}(\lambda)y(\lambda)d\lambda;$$

$$Z_{\lambda1\lambda2}=k\int_{vis}I_{\lambda1\lambda2}(\lambda)z(\lambda)d\lambda; \quad (4)$$

Here $\int_{vis}d\lambda$ is the integral of the visible wavelength range, $k=100/\int_{vis}y(\lambda)d\lambda$, and $x(\lambda)y(\lambda)z(\lambda)$ is a color matching function.

In addition, output values $R_{\lambda1\lambda2}, G_{\lambda1\lambda2}, B_{\lambda1\lambda2}$ of an image capturing device in a case of acquiring the rectangular spectral data $I_{\lambda1\lambda2}(\lambda)$ by the image acquisition apparatus 12 are calculated by the following equations.

$$R_{\lambda1\lambda2}=\int_{vis}I_{\lambda1\lambda2}(\lambda)r(\lambda)d\lambda;$$

$$G_{\lambda1\lambda2}=\int_{vis}I_{\lambda1\lambda2}(\lambda)g(\lambda)d\lambda;$$

$$B_{\lambda1\lambda2}=\int_{vis}I_{\lambda1\lambda2}(\lambda)b(\lambda)d\lambda \quad (5)$$

Here, $r(\lambda)g(\lambda)b(\lambda)$ is the spectral sensitivity characteristics of the image capturing device.

The RGB values $R_{\lambda1\lambda2}, G_{\lambda1\lambda2}, B_{\lambda1\lambda2}$ calculated by Equations (5) are transformed into the rg chromaticity data $r_{\lambda1\lambda2}, g_{\lambda1\lambda2}$ by using Equations (1). Furthermore, the XYZ values $X_{\lambda1\lambda2}, Y_{\lambda1\lambda2}, Z_{\lambda1\lambda2}$ calculated by Equations (4) are transformed into xy chromaticity data $x_{\lambda1\lambda2}, y_{\lambda1\lambda2}$ by using the following equations.

$$x_{\lambda1\lambda2}=x_{\lambda1\lambda2}/(x_{\lambda1\lambda2}+y_{\lambda1\lambda2}+z_{\lambda1\lambda2})$$

$$y_{\lambda1\lambda2}=y_{\lambda1\lambda2}/(x_{\lambda1\lambda2}+y_{\lambda1\lambda2}+z_{\lambda1\lambda2}); \quad (6)$$

The rg chromaticity data $r_{\lambda1\lambda2}, g_{\lambda1\lambda2}$ and the xy chromaticity data $X_{\lambda1\lambda2}, y_{\lambda1\lambda2}$ obtained in this way is stored in an LUT as a correspondence relationship between xy chromaticity data (output) and rg chromaticity data (input) corresponding to the rectangular spectral data $I_{\lambda1\lambda2}(\lambda)$. In such a case, by causing the two parameters ($\lambda1, \lambda2$) to change at equal intervals (for example, at 5 nm intervals) and causing characteristics of the rectangular spectral data $I_{\lambda1\lambda2}(\lambda)$ to change, the correspondence relationship for the rg chromaticity data and the xy chromaticity data of the entire visible range is obtained.

Figure 4A:
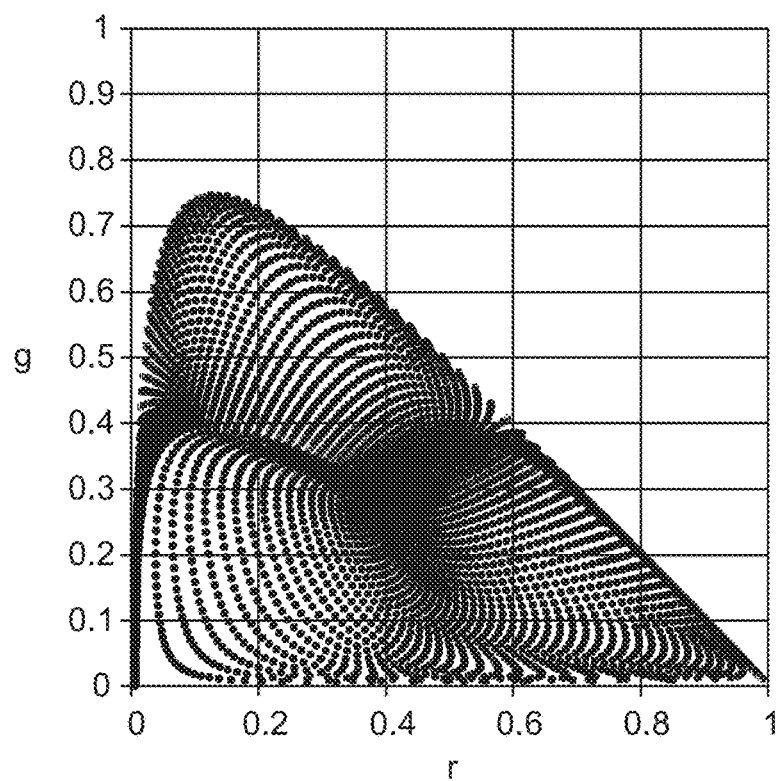
FIGS. 4A and 4B are views illustrating an example of a correspondence relationship between rg chromaticity data and xy chromaticity data in an entire region of a visible range.
Figure 4B:
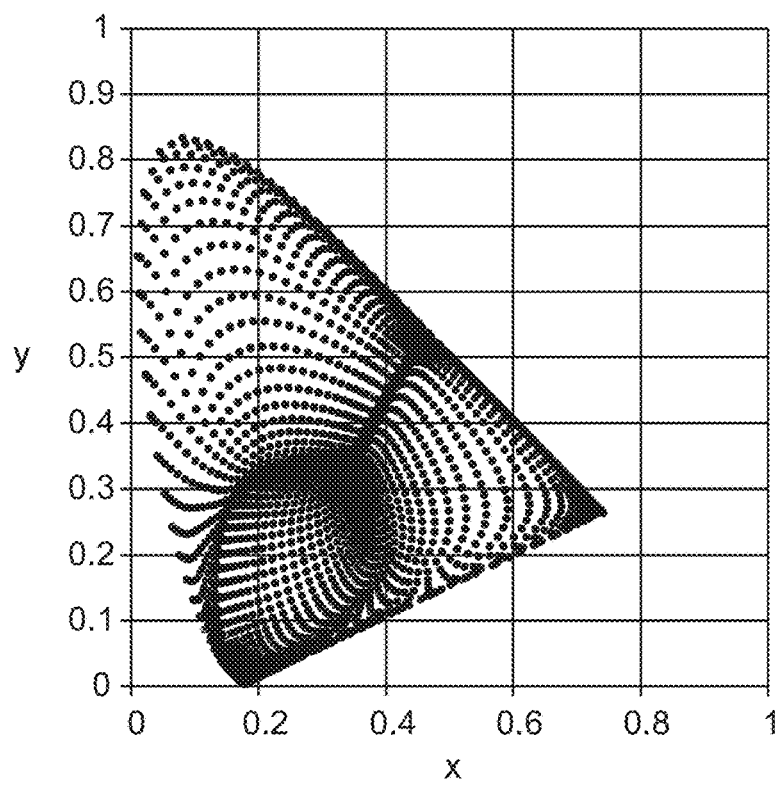

FIGS. 4A and 4B are views illustrating an example of a correspondence relationship between rg chromaticity data (FIG. 4A) and xy chromaticity data (FIG. 4B) in an entire region of a visible range. If an LUT that stores the correspondence relationship illustrated in FIGS. 4A and 4B is used, by an interpolation calculation that refers to the LUT, a calculation of output chromaticity data xy corresponding to any input chromaticity data rg becomes possible.

[Output Total Amount Calculation]

To transform xy chromaticity data into tristimulus values XYZ, the transformation of the following equations become necessary.

$$X=x\Sigma_{XYZ}=x(X+Y+Z);$$

$$Y=y\Sigma_{XYZ}==y(X+Y+Z);$$

$$Z=z\Sigma_{XYZ}=(1-x-y)(X+Y+Z); \quad (7)$$

For the invention of the International Publication 2013/101639, because the XYZ value is unknown, the output total amount $\Sigma_{XYZ}=(X+Y+Z)$ is also unknown. Accordingly, as an alternative to the output total amount $\Sigma_{XYZ}$, a value calculated by $\Sigma_{RGB}=(R+G+B)$ is used as a transformation coefficient (hereinafter referred to as an input total amount) to calculate the XYZ value by the following equations.

$$X=x\Sigma_{RGB};$$

$$Y=y\Sigma_{RGB};$$

$$Z=(1-x-y)\Sigma_{RGB}; \quad (8)$$

If the spectral sensitivity characteristics of the image capturing device of the image acquisition apparatus 12 satisfy a router condition $(r(\lambda)g(\lambda)b(\lambda)=x(\lambda)y(\lambda)z(\lambda))$, $\Sigma_{XYZ}=\Sigma_{RGB}$ is achieved, and accurate tristimulus values are calculated. However, if spectral sensitivity characteristics of a typical image capturing device do not satisfy the router condition, $\Sigma_{XYZ} \neq \Sigma_{RGB}$, as a result, an error occurs in the tristimulus values calculated.

Accordingly, in this embodiment, an output total amount $\Sigma'_{XYZ}$ is calculated by performing a correction according to a correction coefficient gain illustrated in the following equation to an input total value $\Sigma_{RGB}$.

$$\Sigma_{XYZ}=gain \cdot \Sigma_{RGB} \quad (9)$$

By the correction, $\Sigma'_{XYZ} \approx \Sigma_{XYZ}$, and it becomes possible to perform at high precision a transformation of the xy chromaticity data to the tristimulus values XYZ. To perform the correction according to Equation (9), when generating the LUT, the correction coefficient gain is calculated by the following Equations from the relationship between Xm, Ym, and Zm values obtained by measuring a certain color by using a colorimeter or the like, and Rm, Gm, and Bm values output by the image acquisition apparatus 12 with respect to the same color.

$$gain=(Xm+Ym+Zm)/(Rm+Gm+Bm);$$

$$r=Rm/(Rm+Gm+Bm);$$

$$g=Gm/(Rm+Gm+Bm); \quad (10)$$

In other words, the correction coefficient gain indicates a ratio between device-dependent color data RGB and device-independent color data XYZ, with respect to the same color. By adding an output value of an LUT that associates the correction coefficient gain and the rg chromaticity data, expansion is made to an LUT with two element inputs r and g, and three outputs: x, y, and gain. By this, it becomes possible to acquire the correction coefficient gain with respect to the input chromaticity data rg. Note, if the input chromaticity data rg and the rg chromaticity data stored in the LUT do not match, calculating the correction coefficient gain that corresponds to the input chromaticity data rg by the interpolation calculation is a matter of course.

A method of calculating the output total amount $\Sigma'_{XYZ}$ is not limited to the multiplication of the input total amount $\Sigma_{RGB}$ and the correction coefficient gain illustrated in Equation (9). For example, a method of calculating by a linear sum of RGB values illustrated in Equation (11) may be used, and a method of calculating by a polynomial expression that uses non-linear values illustrated in Equation (12) may be used.

$$\Sigma'_{XYZ}=aR+bG+cB+d; \qquad (11)$$

$$\Sigma'_{XYZ}=aR^2bG^2cB^2+dR+eG+fB+gRG+hGB+iBR+j \qquad (12)$$

Note that, in Equations (11) and (12), coefficients a-d or coefficients a-j are added to output values of the LUT associated with the rg chromaticity data. In other words, in comparison to the transformation coefficient $\Sigma'_{RGB}$, it is sufficient if there is a correction method such that $\Sigma'_{XYZ}$ which is a correction result approaches (X+Y+Z), and the correction method is not limited.

[Output Color Data Calculation Unit]

As is clear from the aforementioned description, the output color data calculation unit 116 calculated the tristimulus values XYZ from the output chromaticity data xy by the following equations.

$$X=x\Sigma'_{XYZ}=x\cdot\text{gain}\cdot\Sigma_{RGB};$$

$$Y=y\Sigma'_{XYZ}=y\cdot\text{gain}\cdot\Sigma_{RGB};$$

$$Z=(1-x-y)\Sigma'_{XYZ}=(1-x-y)\cdot\text{gain}\cdot\Sigma_{RGB}; \qquad (13)$$

In this way, a two-dimensional LUT is used to calculate the chromaticity data xy from the chromaticity data rg, and calculate the tristimulus values XYZ from the chromaticity data xy. In such a case, by using $\Sigma'_{XYZ}$, which is the result of correcting $\Sigma_{RGB}$, as the transformation coefficient $\Sigma_{XYZ}$ for transforming xy values into XYZ values, calculating precision of the XYZ values, specifically the color reproducibility precision, improves.

[Second Embodiment]

Below, description is given in detail of an image processing apparatus (a color processing apparatus) and an image processing method (a color processing method) of the second embodiment according to the present invention. Note that in the second embodiment, there are cases in which the same reference numerals are added and detailed description is omitted for configurations approximately the same as those in the first embodiment. In the second embodiment, description is given of an example of adding to the color transformation processing described in the first embodiment a function for determining the existence or absence of information necessary for calculation of the output total amount $\Sigma'_{XYZ}$, and controlling the color transformation processing based on the determination result.

Figure 5:
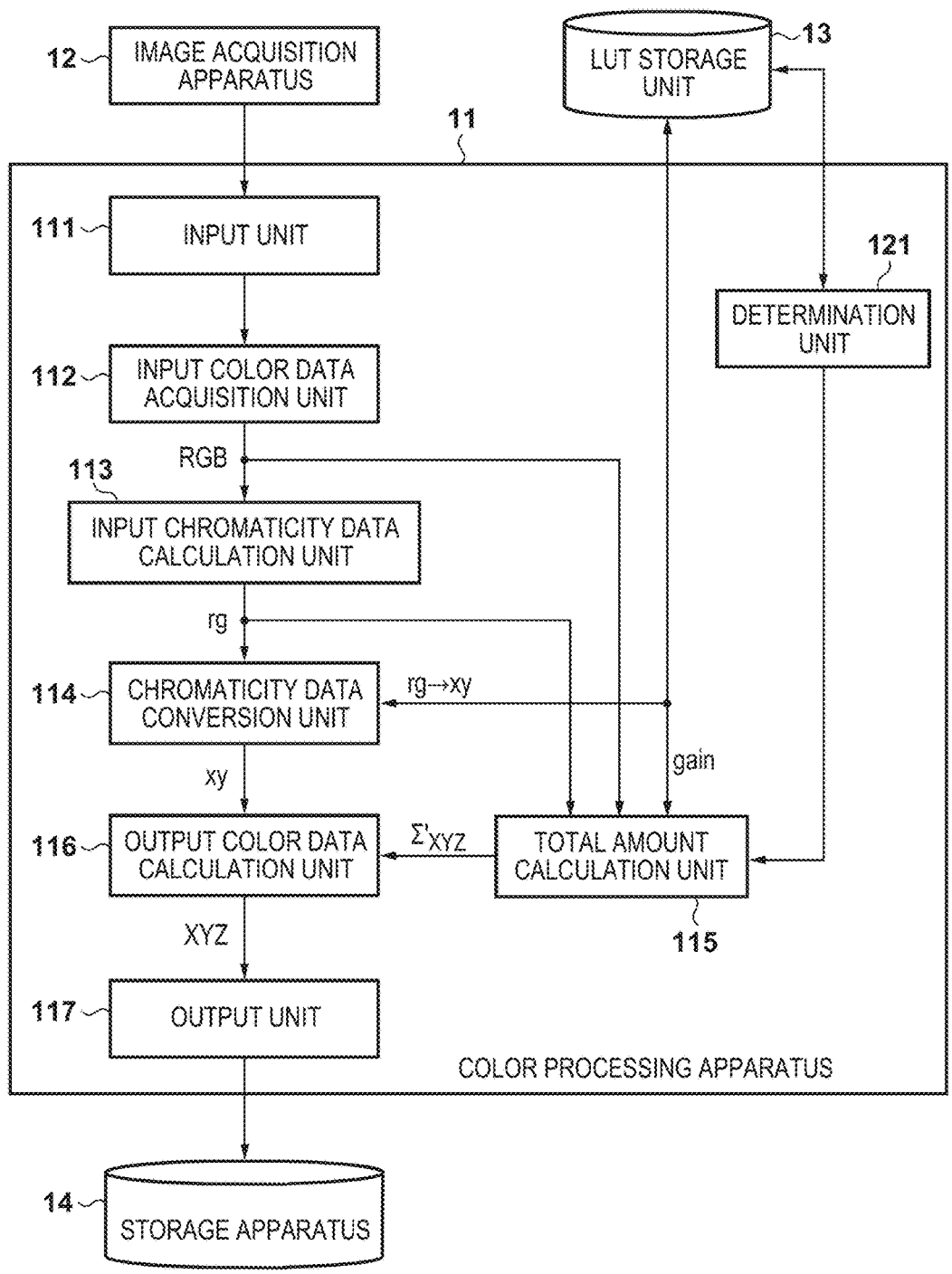
FIG. 5 is a block diagram illustrating a processing configuration example of a color processing apparatus of a second embodiment.

The block diagram of FIG. 5 illustrates an example of a processing configuration of the color processing apparatus 11 of the second embodiment. The configuration of the color processing apparatus 11 illustrated in FIG. 5 comprises, in addition to the processing configuration illustrated in FIG. 1, a determination unit 121 for determining whether an LUT stored by the LUT storage unit 13 includes information necessary for calculation of the output total amount $\Sigma'_{XYZ}$.

Figure 6:
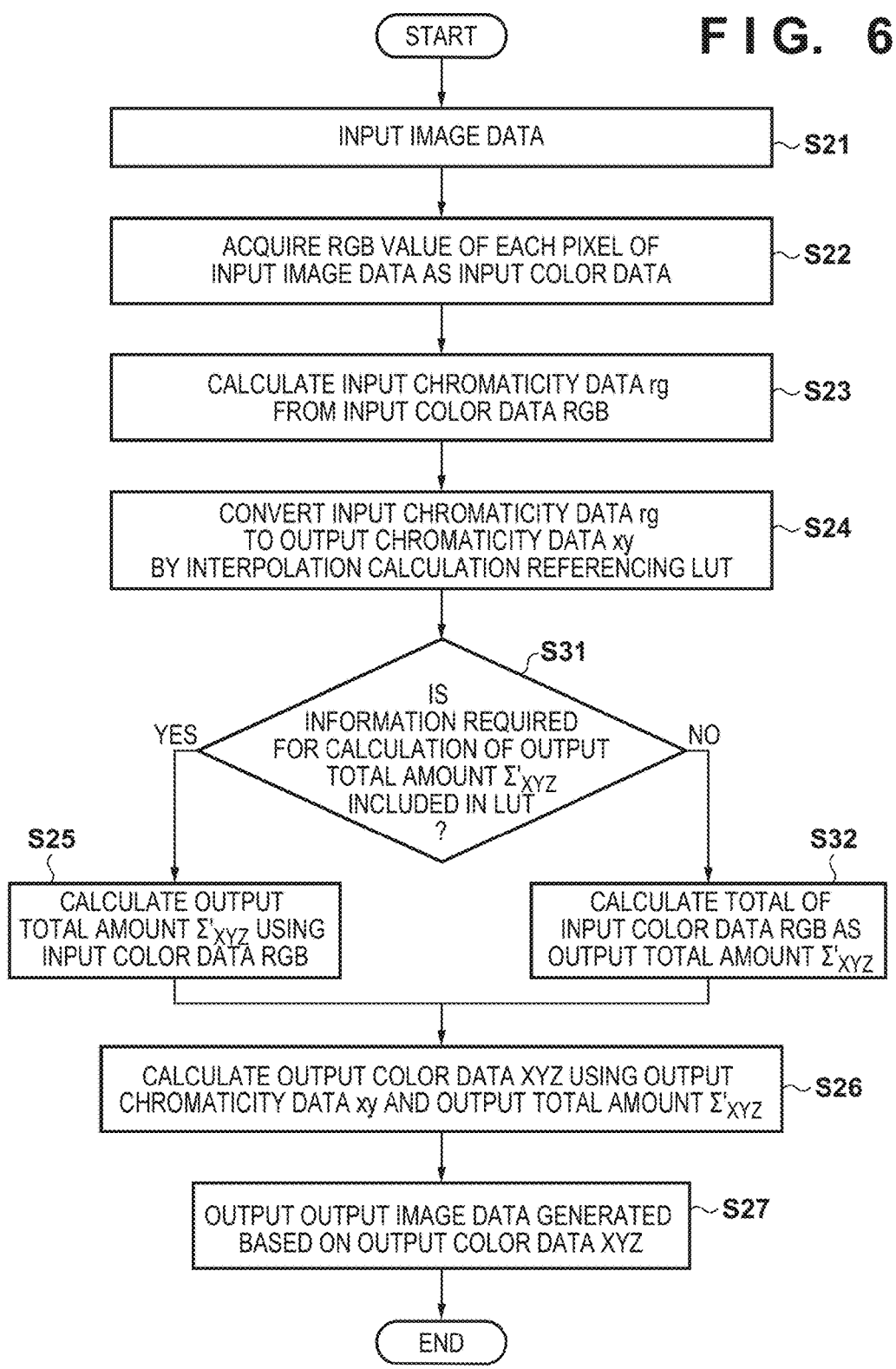
FIG. 6 is a flowchart for describing color transformation processing of the second embodiment.

By the flowchart of FIG. 6, description is given of color transformation processing of the second embodiment. Processing of step S21 to step S24 is similar to that in the first embodiment. Next, the determination unit 121 determines whether the information (for example the correction coefficient gain) necessary for the calculation of the output total amount $\Sigma'_{XYZ}$ is included in an LUT stored by the LUT storage unit 13 (step S31). If the LUT includes this information, the processing proceeds to step S25, and the total amount calculation unit 115 calculates the output total amount $\Sigma'_{XYZ}$ similarly to in the first embodiment.

Meanwhile, if information necessary for calculation of the output total amount $\Sigma'_{XYZ}$ is not included in the LUT, the total amount calculation unit 115 calculates the input total amount $\Sigma_{RGB}$ as the output total amount $\Sigma'_{XYZ}$ (step S32). Subsequently, similar to in the first embodiment, calculation of the output color data XYZ that uses the output total amount $\Sigma'_{XYZ}$ and the output chromaticity data xy by the output color data calculation unit 116 (step S26) and storing of output image data by the output unit 117 (step S27) are performed.

In this way, it becomes possible to perform color transformation processing similar that in the first embodiment only when information necessary for calculation of the output total amount $\Sigma'_{XYZ}$ is obtained, and perform color transformation processing similar to the conventional technique in a case of using an LUT that has not been provided with this information.

[Variation]

The output color data was described as XYZ values above, but there is no limitation to this, and, for example, RGB values of a color space defined by sRGB, AdobeRGB, or the like, or values such as CIELAB, CIELuv, or CIECAM02 may be used for the output color data. In addition, configuration may be taken to set the output color data as XYZ values and subsequently, by a typical definition expression, an ICC profile, or the like, transform the XYZ values into RGB values defined by a standard color space or into values such as CIELAB, CIELuv, or CIECAM02, and output the values as the output image data. In other words, it is possible to apply the present invention in the case of color transformation processing for performing a transformation to device-independent color data after transforming device-dependent RGB values into chromaticity data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-023979, filed Feb. 10, 2016, which is hereby incorporated by reference herein in its entirety.

What is claimed is:

1. A color processing apparatus comprising:
 a first calculation unit configured to calculate first chromaticity data from device-dependent color data;
 a transformation unit configured to transform the first chromaticity data into second chromaticity data by referring to a table;
 a second calculation unit configured to calculate a total amount of device-independent color data from the device-dependent color data by referring to the table, wherein the total amount of device-independent color data is calculated in accordance with a multiplication of a correction coefficient corresponding to the first chromaticity data that is stored in the table, and a sum total of the device-dependent color data; and
 a third calculation unit configured to use the total amount to calculate the device-independent color data from the second chromaticity data.

2. The color processing apparatus according to claim 1, wherein the correction coefficient corresponds to a ratio between a sum total of the device-dependent color data and a sum total of the device-independent color data, with respect to the same color.

3. The color processing apparatus according to claim 1, wherein the table is a two-element input, three output table storing the correction coefficient and the second chromaticity data corresponding to the first chromaticity data.

4. The color processing apparatus according to claim 1, wherein, if information necessary for calculation of the total amount is not stored in the table, the second calculation unit outputs the sum total of the device-dependent color data as the total amount.

5. The color processing apparatus according to claim 1, further comprising an input unit configured to input the device-independent color data from an image input device.

6. The color processing apparatus according to claim 1, further comprising an output unit configured to output the device-independent color data to a storage device.

7. The color processing apparatus according to claim 1, wherein the device-dependent color data is three-dimensional RGB data, the first chromaticity data is two-dimensional rg chromaticity data, the second chromaticity data is two-dimensional xy chromaticity data, and the device-independent color data is three-dimensional XYZ data.

8. A color processing method, comprising:
 calculating first chromaticity data from device-dependent color data;
 transforming the first chromaticity data into second chromaticity data by referring to a table;
 calculating a total amount of device-independent color data from the device-dependent color data by referring to the table, wherein the total amount of device-independent color data is calculated in accordance with a multiplication of a correction coefficient corresponding to the first chromaticity data that is stored in the table, and a sum total of the device-dependent color data; and
 using the total amount to calculate the device-independent color data from the second chromaticity data.

9. A non-transitory computer-readable storage medium storing a program for causing a computer to function as
 a first calculation unit configured to calculate first chromaticity data from device-dependent color data;
 a transformation unit configured to transform the first chromaticity data into second chromaticity data by referring to a table;
 a second calculation unit configured to calculate a total amount of device-independent color data from the device-dependent color data by referring to the table, wherein the total amount of device-independent color data is calculated in accordance with a multiplication of a correction coefficient corresponding to the first chromaticity data that is stored in the table, and a sum total of the device-dependent color data; and
 a third calculation unit configured to use the total amount to calculate the device-independent color data from the second chromaticity data.

\* \* \* \* \*